Patented Nov. 1, 1938

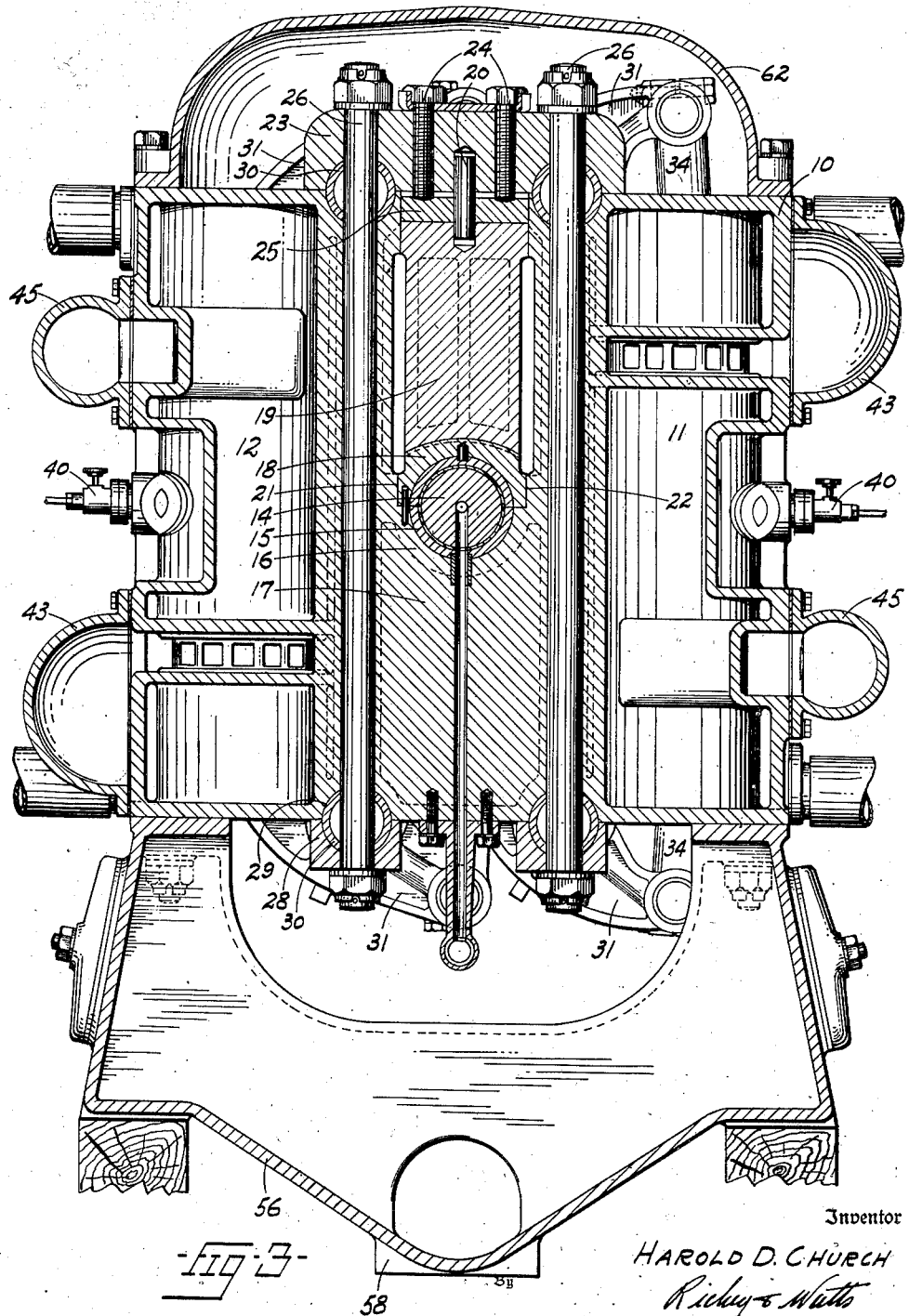

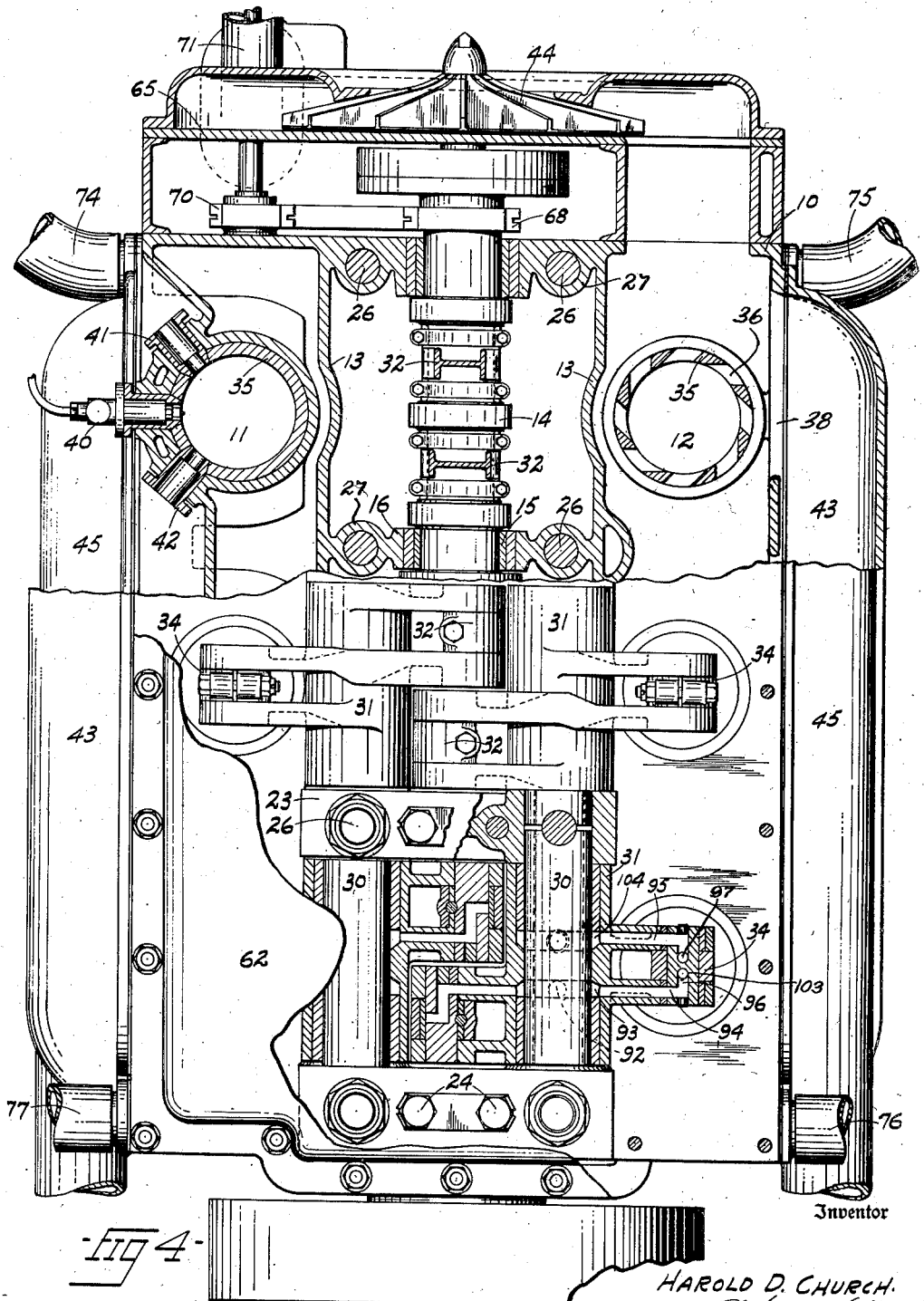

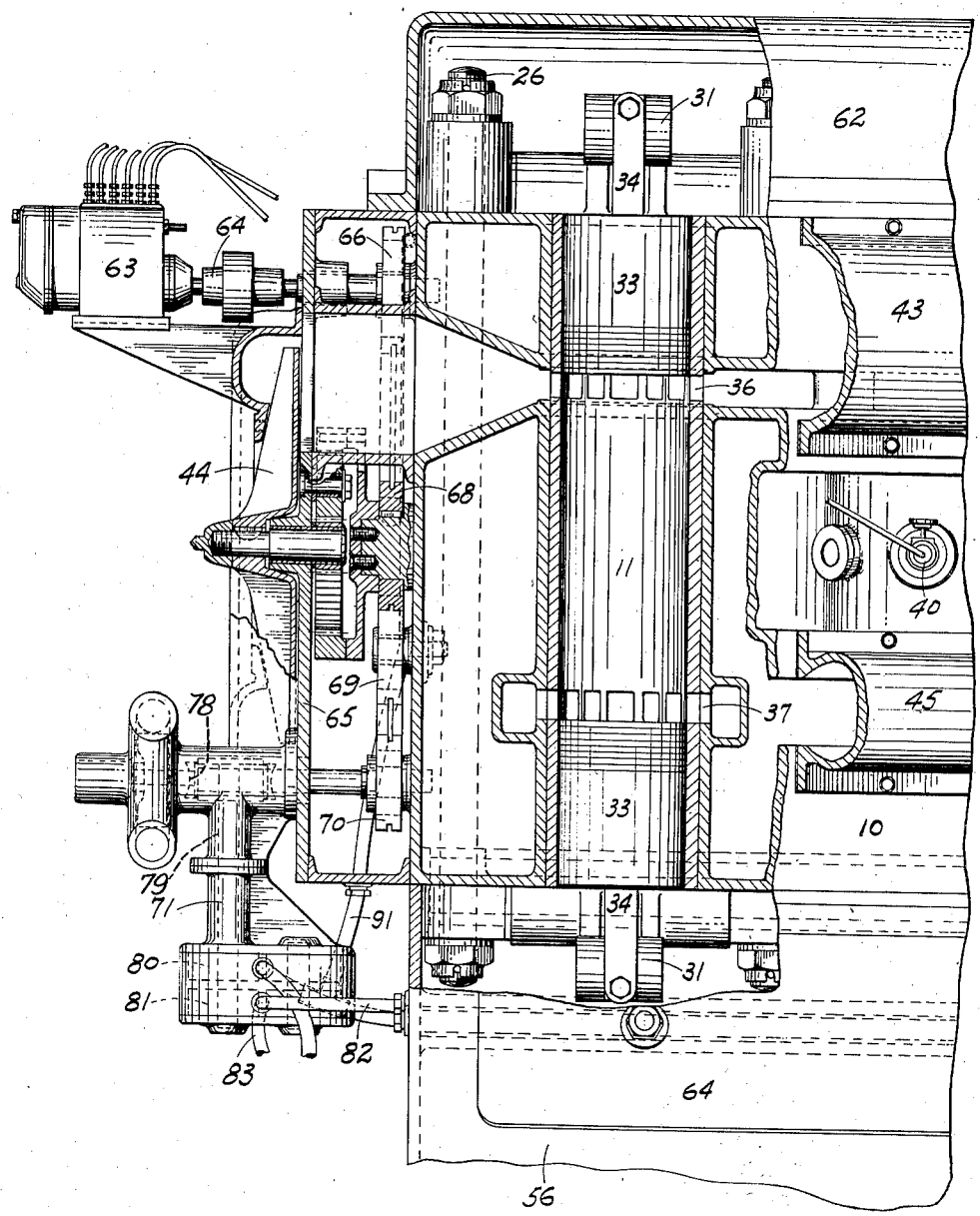

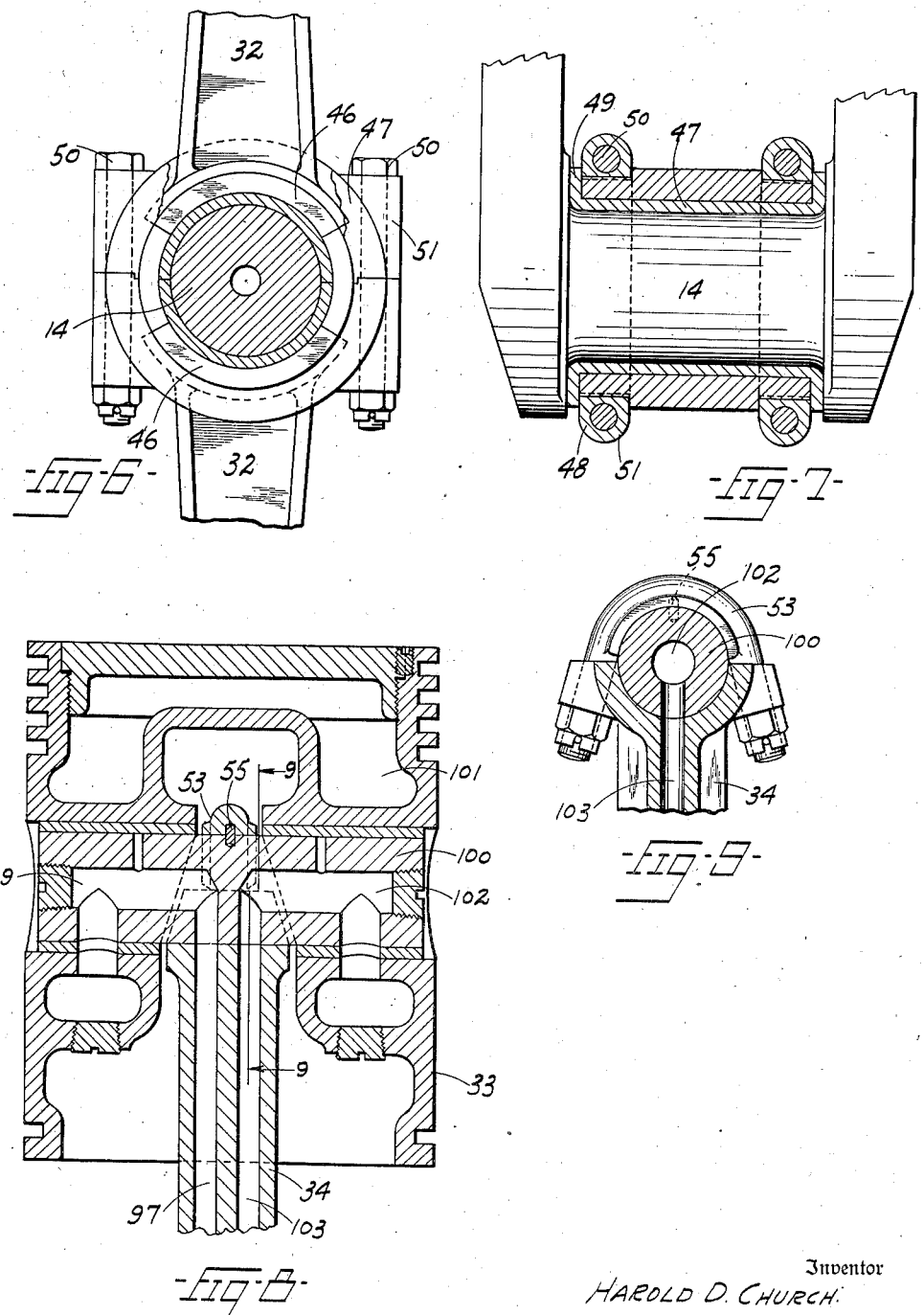

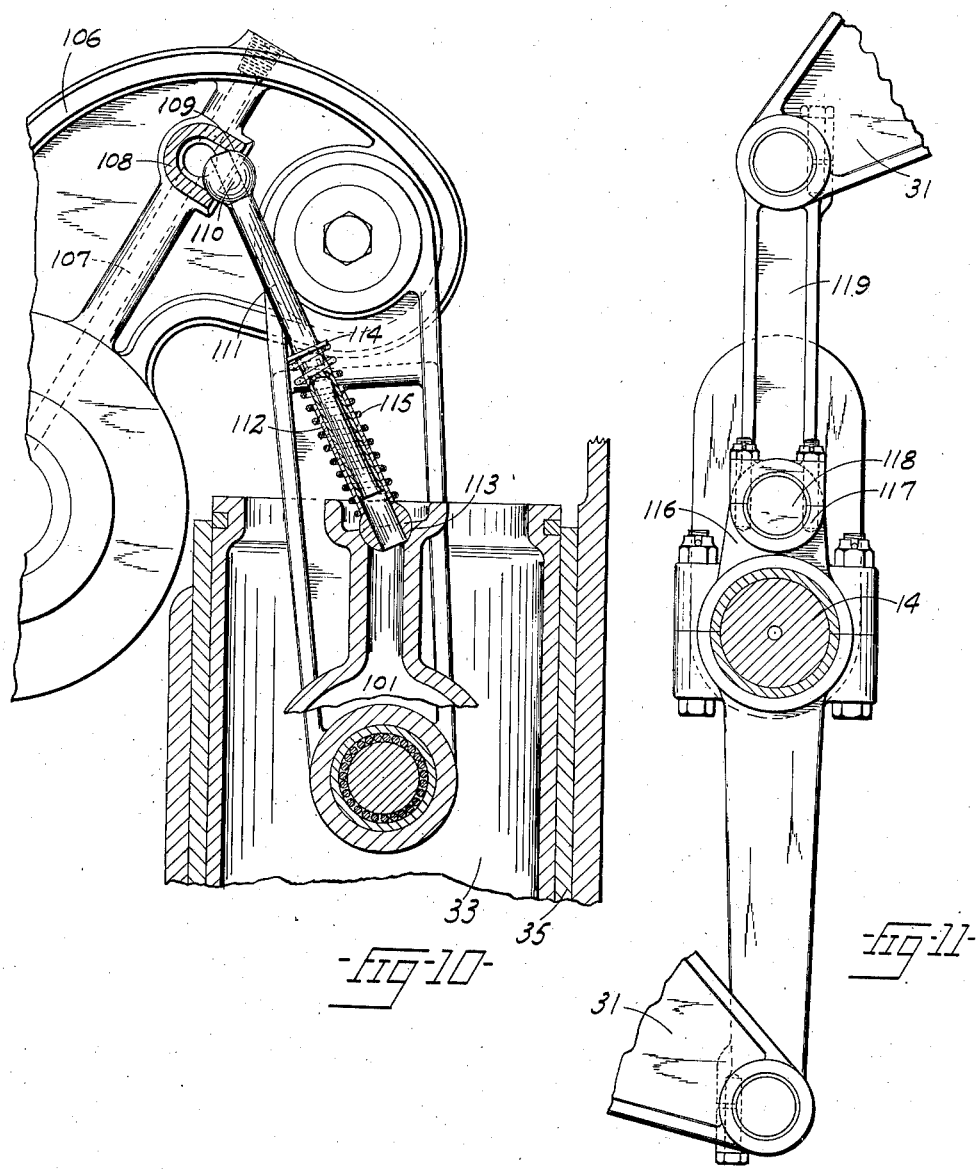

2,134,811

UNITED STATES PATENT OFFICE 2,134,811

INTERNAL COMBUSTION ENGINE

Harold D. Church, Cleveland Heights, Ohio

Application January 9, 1936, Serial No. 58,370

14 Claims. (Cl. 123—51)

This invention relates broadly to internal combustion engines, and more specifically to improvements in two cycle Diesel engines of the opposed piston type.

One of the objects of the invention is to provide an engine of less weight, smaller over all dimensions and greater brake horsepower efficiency per pound than engines of the conventional Diesel type heretofore constructed.

Another object of the invention is to provide a design which will accommodate the more general use and broader application of light metal alloys.

Another object of the invention is to provide a structure which affords ready accessibility to the journal bearings and enclosed working parts of the engine.

Another object of the invention is to provide a design embodying a cylinder unit assembly which is adaptable for multi-unit application in the construction of larger engines.

Another object of the invention is to construct an engine which is more economic of manufacture per developed brake horsepower than other engines of this type heretofore constructed.

In general the improved engine comprises an organization of cylinder units cast en bloc, each unit comprising a pair of vertically developed cylinders arranged in parallel spaced relation. Each of the cylinders is provided with a pair of opposed pistons operatively connected with the crank shaft which is disposed between the cylinders intermediate their ends. The crank shaft is formed with a pair of crank pins for each cylinder unit or in other words a pair of crank throws for each set of four pistons. The crank pins are spaced 180° on centers or in slight angular variation thereto when the engine is built for supercharged operation. On each crank pin there is mounted a pair of coaxially aligned connecting rods pivoted to rocker arms mounted adjacent the respective ends of the cylinders. The rocker arms are suitably offset to effect alignment between the crank pin and cylinder centers. The rocker arms are connected to the pistons by rods or links, the piston in the coaxially aligned cylinders being united with connecting rods on opposed throws of the crank shaft. The caps for the crank shaft main bearings and the rocker arm journal caps are supported by bolts common to the two assemblies. These bolts are mounted in the cylinder block being organized therein to sustain the thrust and vibratory reactions imposed upon the crank shaft bearings. In addition this structure facilitates the ready assembly of the crank shaft from the top of the engine and accommodates access to the rocker arms, connecting rods and piston links for purposes of adjustment or repair.

The construction further comprehends the provision of an oil circulatory system for cooling the pistons and lubricating the bearings for the various moving parts of the assembly. The cooling system for the pistons makes possible the use of higher mean effective pressures than could be otherwise employed. The present design contemplates a means of circulating a cooling mechanism to the rocker arms, piston links and bearings therefor eliminating the structures usually employed for such purposes, which have been found impractical for high speed operation.

The advantages of the engine embodying the present invention are realized by the elimination of the cylinder heads, the valves and valve operating mechanism, accessibility to the connecting rods, crank shaft and crank pin bearings, reduction of piston side thrust upon cylinder walls and the adaptability of the assembly for the use with low unit pressure bearings for the crank shaft and piston links.

In engines of the opposed piston type heretofore constructed the connecting rods have either been mounted upon separate crank pins arranged in contiguous relation, or with forked rods mounted upon a single pin. In the former construction the engine was of excessive length since twice the number of crank pins were employed. In the latter construction the bearing areas of the connecting rods were sacrificed or the crank pins were necessarily lengthened. The present invention embodies a pair of diametrically opposed connecting rods mounted upon a single pin of the crank shaft, the length of which need be no greater than that of a pin for a single rod. This structure makes possible the use of a single crank shaft for an opposed piston engine, together with short connecting rods and a short crank shaft reducing to a minimum the whipping effect of the connecting rods and also minimizing crank shaft tortional vibrations. Each of the rods constitutes the bearing cap for the other, thus utilizing for working purposes both halves of the bearing. The alternate construction disclosed herein embodies a rod of the conventional form but having a second rod pivotally mounted upon the bearing cap thereof. This structure also facilitates conservation of the crank pin length.

Other advantages of the invention reside in the neutralization of thrust upon the engine bearings consequent upon the simultaneous application of compression and combustion pressure loads upon the crank pins. Moreover, the loads and imposed stress upon the rocker arm bearing are borne by the supporting bolts therefor, thus facilitating the use of lighter alloys and lighter construction of the cylinder block.

A further advantage of the present invention resides in the organization of the crank shaft relative the position of the cylinders. This arrangement facilitates maximum piston displacement in a given set of over all dimensions; the use of interchangeable parts, conservation of weight and an appreciable reduction in the length and breadth of the engine which accommodates the application thereof for use in transportation work where pay load economies are of primary importance.

Another object of the invention resides in the advantageous position of the crank shaft, which is located near the geometrical center of the end profile of the engine. This organization facilitates the use of an engine and generator combination within a minimum of installation space.

Referring to the drawings wherein the preferred embodiment of the invention is illustrated:

Fig. 3 is also a transverse vertical section taken on a plane intermediate a pair of cylinders;

Fig. 4 is a plan view partially in section, a portion of the view being taken on the plane passing through the center of the combustion zone of the cylinder, another portion of the illustration being taken on a plane passing through the crank shaft bearings and the connecting rod linkage, another portion of the illustration is a view cut away to show some of the accessory driving mechanisms while the remaining portions of the figure are shown in plan;

Fig. 5 is a vertical longitudinal section through the forward end of the engine, illustrating the relation of the fuel injection mechanism with the intake and exhaust ports, also fragmentary portions of the engine accessories;

Fig. 6 is a detailed sectional view of a fragmentary portion of the crank shaft and connecting rod structure;

Fig. 7 is a longitudinal sectional view of the connecting rod illustrated in Fig. 6;

Fig. 8 is a vertical section illustrating the arrangement of the passages in the fluid circulatory system;

Fig. 9 is a detail view in section illustrating the structure of the connection between the piston and link rod, the section being taken on the plane indicated by the line 9—9 in Fig. 8;

Fig. 10 is a detail view partially in section showing the structure of the rocker arm and piston link rod, the figure also illustrating the structure of an alternate method of delivery of the cooling fluid to a piston; and Fig. 11 is an elevational view partly in section of a modified connecting rod structure and parts associated therewith.

Figure 2:
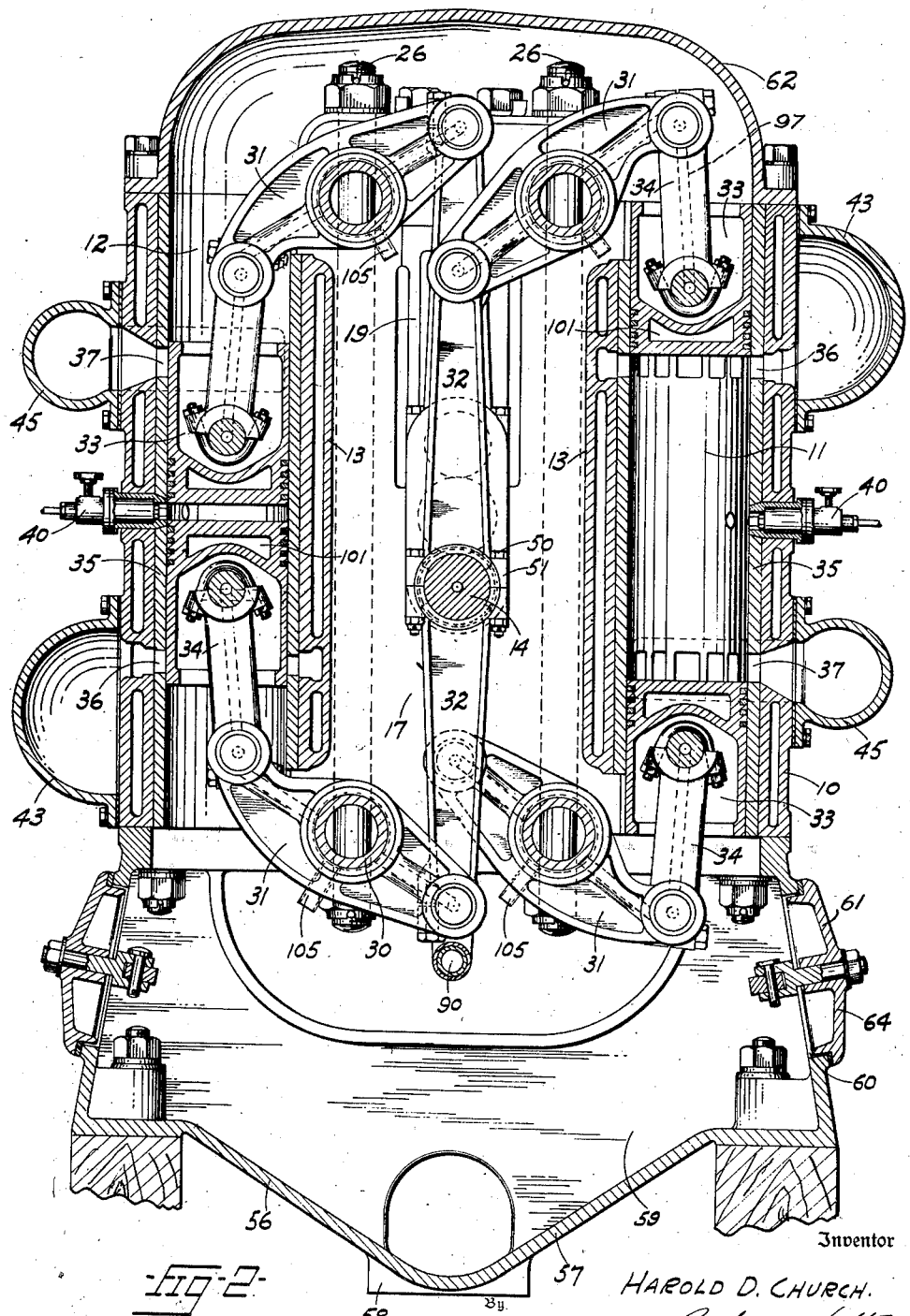
Fig. 2 is a transverse vertical section taken on a plane through the medial axis of a pair of cylinders.

Referring first to Fig. 2, the engine comprises a cylinder block 10 embodying a series of longitudinally disposed cylinders 11 and a second similar series of cylinders 12 arranged in parallel relation thereto. The cylinder block 10 is formed with water jackets 13 which encompass each series of cylinders 11 and 12 extending from the forward end of the engine to the rear thereof and defining two spaced rectangular blocks or cylinder banks. The crank shaft 14 is disposed intermediate the cylinder banks 11 and 12, being supported therein upon bearings 15 mounted on seats 16 formed in transverse webs 17, integral with the water jackets 13 and connecting the cylinder banks 11 and 12.

The bearings 15 are retained by caps 18, the upper portion thereof being preferably formed with a spherical surface for engagement with a cover plate 19 of complementary configuration. The alignment of the caps with the plates 19 is maintained by dowel pin 20 and the cap is retained transversely by the shoulders 21 and 22 in the bearing seats 16. The cover plate 19 is retained by a bearing block 23 having studs 24 therein arranged for engagement with a hardened steel thrust member 25 doweled to the plate 19 and bearing block 23. The block 23 is retained by bolts 26 mounted in bosses 27 extending vertically throughout the cylinder block and through the webs 17. The lower ends of the bolts 26 are adapted to secure the rocker arm bearing blocks 28 upon the face of the cylinder banks 11 and 12. The bearing blocks 23 and 28 and the cylinder block 10 are formed with recesses 29 line reamed upon assembly to receive the pins 30 upon which the rocker arms 31 are journalled.

The cylinder block 10 comprises a substantially U-shaped structure, the cylinder banks 11 and 12 forming the vertical legs thereof which the transverse webs 17 constitute the lower tie member. The upper free ends of the cylinder banks 11 and 12 are united by the bearing blocks 23 or rocker arm caps 23, bolted to the face of each of the cylinder banks. In addition the cylinder banks are further secured by the rocker arm shafts 30 which when sealed in the bearing journals constitute dowel pins between the caps and the cylinders. With this construction and by virtue of the organization of these through bolts 26 which receive the loads imposed upon the crank shaft, the cylinder block may be made of light metal alloy of relatively thin section without danger of failure consequent to the deleterious reactions of crank shaft loads.

As shown, the end portions of the rocker arms 31 may be yoked to receive the connecting rods 32 which as will be seen in Fig. 4 are assembled in pairs upon the crank pins, the rods extending in diametrically opposed relation thereon. The crank pins as illustrated herein are disposed on centers spaced 180° apart. However, the angular relation of the pins may be varied a few degrees to produce a supercharged operation of the engine.

The cylinders are fitted with pistons 33 adapted for reciprocative movement toward and away from the central portion of the cylinders. The pistons are driven by links 34 connected to the outer ends of the rocker arms 31 coupled in turn to the connecting rods on the respective throws of the crank shaft. The cylinders are preferably constructed with liners or sleeves 35 in intimate engagement with the cylinder bores. Sleeves in contact with the cooling water or integrally formed cylinders may likewise be employed and are contemplated as falling within the present design. The sleeves and cylinder walls of the engine are formed with apertures adjacent their outer ends constituting intake ports 36 and exhaust ports 37. As will be seen in Fig. 4 the ports 36 are machined tangential to the bore of the cylinder, the intermediate webs constituting baffle plates which direct the air flowing through the passage 38 against the inner wall of the cylinder thus causing an eddy or swirling turbulence of air in the cylinder during the scavenging and charging portions of the piston stroke. The exhaust ports 37 in the cylinder block are arranged slightly nearer the center of the cylinder than the intake ports 36 so that they may be uncovered or opened in advance of the intake port and thus assure the complete expulsion of the burnt products of combustion on each operative cycle of the engine. As will be seen in Fig. 2 the intake and exhaust ports are disposed relative to the extreme outer piston travel to be fully opened thereby. Moreover, the piston skirts are of suitable length to cover the intake and exhaust ports when the pistons are disposed at the extreme inner end of their travel.

The fuel injection nozzles 40 are located in the central portion of the cylinders intermediate the top dead centers of the pistons. The nozzles may be of any conventional form, but are preferably of the multiple orifice type, which embody a plurality of openings in substantially the same plane adapted to deliver a fan shaped fuel spray into the combustion space. Adjacent the injector nozzles 40, in a common plane therewith, there is a nipple 41 adapted for connection with a conduit (not shown) leading from a source of compressed air and provided to facilitate the starting of the engine. Adjacent the other side of the nozzle 40, there is a connection 42 for the reception of a combined test cock and safety valve.

The air intake manifold 43 is mounted upon the outer side walls of each bank of cylinders 11 and 12, being arranged for communication with a blower 44 driven from the crank shaft 14. The exhaust manifolds 45 are mounted on the outer faces of the cylinder banks 11 and 12 and may be constructed as shown or provided with water jackets to facilitate the cooling of the exhaust gases.

The connecting rods 32 are mounted in pairs in coaxial alignment on each of the crank pins. The outer ends of the rods are pivotally connected with the rocker arms, which are suitably offset to effect alignment with the pistons 33. In the embodiment illustrated the connecting rods 32 are formed with an arcuate segmental base portion 46 engageable with a split bushing 47 mounted on the crank shaft pin. The outer edges of the shoes 46 are shouldered to retain clamping rings 48 which are laterally supported by the flanged end portions 49 of the bushing 47. The rings 48 are of segmental form being united by bolts 50 supported in bosses 51 in the ring segments.

The construction of the connecting rod above described constitutes a single form of one of several practical embodiments which may be employed herein with satisfactory results, it will be understood, however, that other types of rod mounting are contemplated as falling within the purview of the present invention. The inner ends of the piston rods or links 34 are formed with laterally extending bosses 52 slotted to receive a U-bolt 53 engageable with a wrist pin 54 having a dowel pin 55 therein to assure the aligned relation of the pin with the rod.

The cylinder block 10 is mounted upon an engine base 56 which may be formed with a wet sump or as shown with an apron 57 which converges to suitable drains 58 communicating with an oil reservoir remote from the engine. The engine base is formed with reinforcing ribs 59 and is provided with openings or hand holes 60 positioned to facilitate access to the working parts in the base of the engine. The openings 60 are enclosed by cover plates 61 of suitable size to facilitate the assembly of the rocker arm linkage and pistons therethrough. The upper ends of the cylinder banks are fitted with cover plates 62 which extend throughout the length of the engine to enclose the rocker arms and associated linkage.

Figure 1:
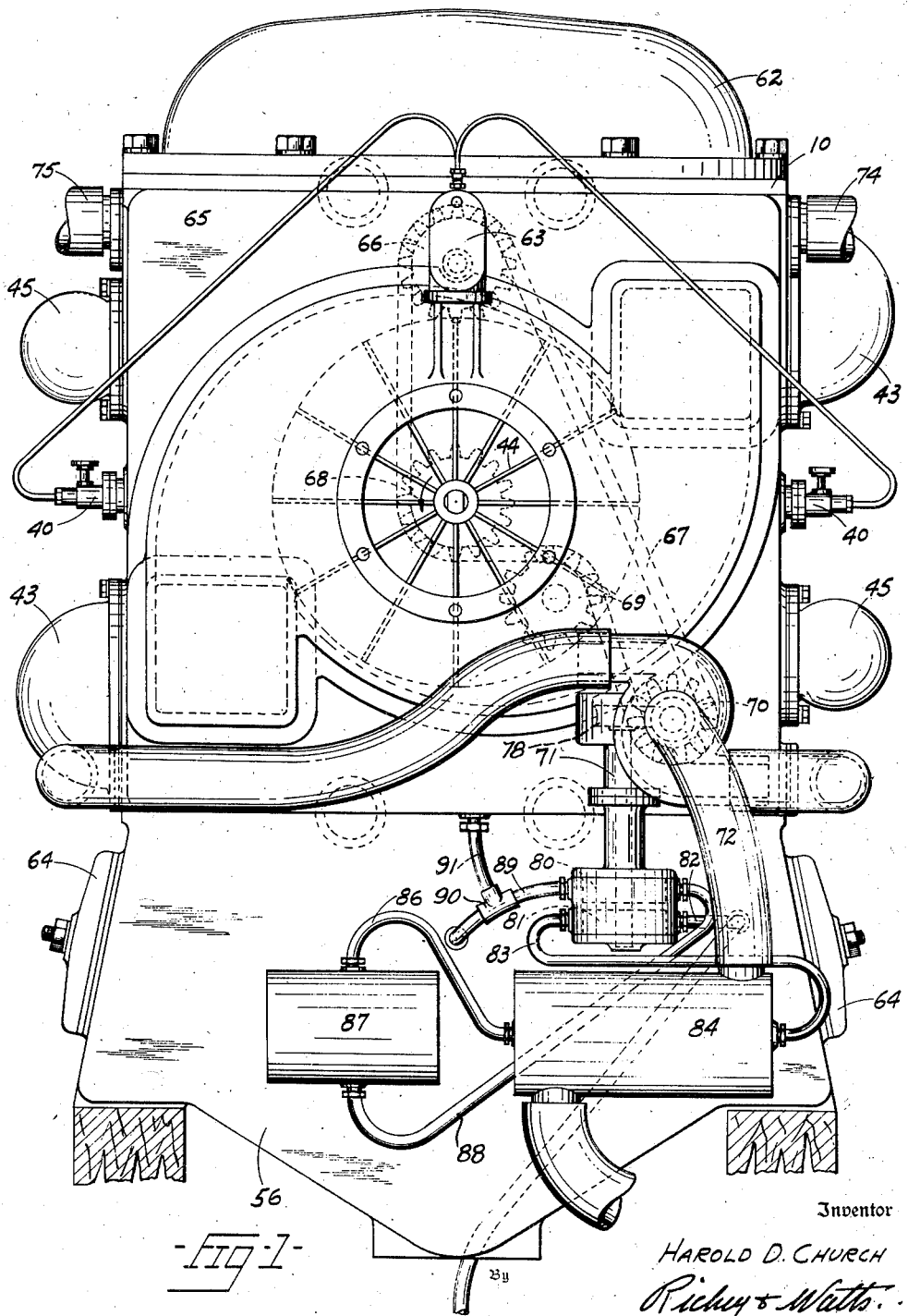
Figure 1 is an elevational view of the front end of the improved engine.

As will be seen in Figs. 1 and 5, the fuel injection conduits are connected with a fuel pump unit of conventional form or may be provided with independently operated pumps adjacent each port opening. The pump unit 63 shown herein comprises a plurality of pistons operable through a driving connection coupled with a shaft 64 which is journalled in the engine cover plate 65. The shaft 64 is driven through a sprocket 66 having a chain 67 thereon driven from a sprocket 68. The chain 67 is further engaged with an idler sprocket and tension mechanism 69 and also passes about a third sprocket 70 mounted upon the drive shaft for the water and oil pump unit 71. The water pump element of the unit 71 is provided with an intake conduit 72 communicating with the water jackets in the cylinder banks 11 and 12. Circulation of the water is established by return lines 74, 75, 76 and 77. The oil pump element of the unit 71 is driven through worm gearing 78 connected with a shaft 79 having superposed pinions 80 and 81 thereon, which are intermeshed respectively with idler pinions to form a two stage pump of the impellor or oil gear form. The oil element of the unit pump 71 is provided with an intake conduit 82 leading to the primary gearing 81 thereof and an exhaust line 83 which leads from the pump to an oil cooler 84 connected with the water pump. The oil after passing through the oil cooler 84 is forced through a conduit 86 to a filler 87 thence through a conduit 88 to the secondary gearing 80 of the oil pump where it is expelled through a conduit 89 communicating with an oil gallery 90 and a conduit 91 extending upwardly through the engine. The oil gallery 90 is in fluid communication with the main crank shaft bearings and rocker arm journals. As will be seen in Fig. 4, the tubular rocker arm pins 30 together with their brackets constitute a continuous passage throughout the length of the engine to provide for the passage of cooling and lubricating oil to the rocker arm bearings, the links 34 and the pistons 33. Fluid communication from the rocker arm pins 30 is effected through an aperture 92 connected with an annular groove 93 in the bore of the rocker arm 31. Communicating with the groove 93 there is a pair of diametrically opposed passages 94 and 95 arranged to convey the fluid to the pivotal connections in the connecting rods 32 and links 34. The passage 94 is connected with an opening 96 in the rocker arm and with a canal 97 in the link 34.

The canal 97 registers with a longitudinal bore 99 extending partially through the wrist pin 100. The body of the piston is formed with a chamber 101 which is in fluid communication with a second longitudinal bore 102 coaxially aligned with the bore 99 and extending partially through the wrist pin. The bore 102 is in fluid communication with a passage 103 in the link 34 which provides a fluid return line for the cooling oil circulatory system. From the passage 103 the oil flows into an annular groove 104 in the bore of the rocker arm 31 which is connected with a drain tube 105 disposed at a suitable angle in the boss of the rocker arm to deflect the fluid expelled from the pistons from entering the cylinder bore and to direct the same into the portion of the engine intermediate the cylinder banks 11 and 12 where it will flow into the oil drain 58.

In Fig. 10 a modified form of a fluid connection between the rocker arm and link is shown, this structure being the form preferred for general application since it is adaptable for use where anti-friction bearings are employed. As illustrated the rocker arm 106 is provided with an oil passage 107 which is in fluid communication with a transverse bore in bosses 108 formed in opposite faces of the end portion of the rocker arm. The bosses 108 are machined with seats 109 to receive the spherical end 110 of a tube 111. The opposite end of the tube 111 is telescopically engaged within a tube 112 having a ball formed on the end thereof which engages a seat 113 in a boss drilled to deliver the cooling fluid to the piston chamber 101. The tube 111 is provided with a collar 114 adapted to support a compression spring 115 which is mouned to retain the tube 112 in spring pressed engagement upon the seats 109 and 113 respectively. The tube assembly is mounted upon each side of the rocker arm 106 and as heretofore described is arranged to facilitate the circulation of cooling oil in the piston jacket or chamber 101.

As will be seen in Fig. 11, a modified and preferred form of connecting rod mounting is shown which embodies a bearing cap 116 having a boss 117 thereon which is bored to receive a wrist pin 118 adapted to support a connecting rod link 119. This structure facilitates adequate bearing support for the connecting rod mounted upon the crank pin and in addition preserves the advantage of mounting two rods on a single pin thus reducing the length of the engine.

Since the connecting rod and link are fulcrumed in spaced relation and the reciprocative movement thereof is generated through different arcuate paths, the travel of the pistons controlled thereby is faster or slower during certain portions of the stroke than that of connecting rods mounted upon a common center. This variable rate of piston travel can be employed with material advantage in combination with crank pin positions varying from 180° centers to effect the supercharged operation of the engine.

Although the foregoing description is necessarily of a detailed character, in order that the invention may be completely set forth, it is to be understood that the specific terminology is not intended to be restrictive or confining, and that various arrangements of parts and modifications of structural detail may be resorted to without departing from the scope or spirit of the invention as herein claimed.

I claim:

1. An internal combustion engine of the opposed piston type comprising, a pair of cylinders disposed in spaced relation, a crank shaft intermediate said cylinders, a pair of opposed crank pins in said shaft, a pair of connecting rods on each of said crank pins, oppositely disposed rocker arms mounted adjacent the ends of said cylinders and connected with said connecting rods, said rocker arms having fluid passages therein, pistons having chambers therein in said cylinders, links connecting said pistons with the opposed ends of said rocker arms, bosses in said rocker arms having openings therein connected with said fluid passages, bosses in said pistons having openings therein connected with said chamber in said pistons, a pair of tubes one telescopically engaged upon the other, spherical heads on the outer ends of said tubes, and spring means associated with said tubes to maintain said spherical heads in self sustained engagement with the respective openings in said piston and said rocker arm.

2. An internal combustion engine of the two stroke cycle opposed piston type comprising, a pair of cylinders disposed in parallel relation, a crank shaft intermediate the central portion of said cylinders, a pair of opposed crank throws on said shaft, a pair of connecting rods oppositely disposed on each side on each of said crank throws, rocker arms mounted adjacent the ends of said cylinders and pivoted to said connecting rods, shafts for said rocker arms, opposed pistons in said cylinders, links connecting said pistons with said rocker arms, plates uniting said cylinders and having recesses therein aligned with similar recesses in the end walls of said cylinders, said recesses constituting journal bearings for said rocker arm shafts, and said shafts constituting dowels to effect the alignment and retention of said cylinders.

3. In an internal combustion engine of the opposed piston type, a cylinder block comprising a series of longitudinally aligned cylinders, a second series of longitudinally aligned cylinders spaced thereupon and parallel thereto, said cylinders being cast en bloc and united with integral transversely disposed webs, crank shaft bearings in said webs disposed intermediate the ends of said cylinders, bearing caps for said crank shaft bearings, rocker arm bearing blocks mounted upon the end portions of said cylinders, bearing plates adjacent said crank shaft bearing cap disposed in abutting relation to said bearing blocks and to the bearing caps, and bolts extending throughout the length of said cylinders for the retention of said plates and said bearing caps.

4. An internal combustion engine of the two stroke cycle opposed piston type comprising, a cylinder block having recesses in the upper portion thereof, a pair of cylinders therein disposed in parallel relation, pistons therein, transverse walls uniting the lower portions of said cylinders, a crank shaft intermediate the central portion of said cylinders and mounted in said walls, connecting rods mounted on said crank shaft, rocker arms mounted adjacent the ends of said cylinders and connected with said connecting rods, links connecting said pistons with the opposed ends of said rocker arms, plates spanning said recesses in the upper portion of said cylinder block and constituting bearing caps for said rocker arms.

5. An internal combustion engine of the opposed piston type comprising, a pair of cylinders disposed in spaced relation, a crank shaft between said cylinders, a pair of opposed crank throws on said shaft, a pair of connecting rods oppositely disposed on each of said crank throws, rocker arms mounted adjacent the ends of said cylinders and connected with said connecting rods, pistons having chambers in the head thereof, links pivotally connected to said pistons and with the said rocker arms, lubricant passages in said rocker arms, mechanism for circulating lubricant under pressure, connections in said rocker arms communicating with said lubricant circulating mechanism, and fluid passages in said pistons for conducting the lubricant to and from said chambers in the head of said pistons to effect the cooling thereof.

6. An internal combustion engine of the opposed piston type comprising, a pair of cylinders disposed in spaced relation, a crank shaft intermediate said cylinders, a pair of opposed crank pins in said crank shaft, a pair of connecting rods oppositely disposed on each of said crank pins, rocker arms mounted adjacent the ends of said cylinders and connected with said connecting rods, oil passages in said rocker arms, mechanism for supplying oil under pressure, pistons having chambers in the heads thereof in said cylinders, links connecting said pistons with the opposed ends of said rocker arms, bosses in said rocker arms having openings therein connected with said oil passages, bosses in said pistons having openings therein connected with said chamber in said pistons, and pairs of telescopic tubular assemblies engaged with said openings in said pistons and said rocker arms to effect the circulation of oil to and from said chambers in said piston.

7. An internal combustion engine embodying a pair of spaced cylinders, transverse webs uniting the side walls of one end thereof, recesses therein forming crank shaft bearing seats, a crank shaft therein, bearing caps thereon, plates thereover connecting the ends of said cylinders and sustaining said bearing caps, rocker arms, shafts therefor, rocker arm journal caps, said shafts being mounted in said block adjacent the ends of the cylinders and retained respectively by said plates and said journal caps, opposed pistons in said cylinders, connecting rods mounted on the ends of said rocker arms and connected respectively with said pistons and said crank shafts, and bolts uniting said rocker arm journal caps and said plates and adapted to sustain the working forces imposed upon the moving parts within the engine.

8. A cylinder block comprising a plurality of cylinders disposed in spaced parallel relation, transverse webs uniting said cylinders, said webs being formed with recesses adjacent an end of said cylinders, crank shaft bearing seats in said webs, a crank shaft therein, bearing caps thereon, tie plates spanning said recesses, opposed pistons in said cylinders, rocker arms, fulcrums therefor, links connecting said rocker arms with said pistons, rods connecting said rocker arms with said crank shaft and through bolts for supporting said plate and said rocker fulcrums and adapted to resist the working forces imposed upon the moving parts within the engine.

9. An internal combustion engine comprising a base, a cylinder block thereon, vertically disposed cylinders therein disposed in spaced parallel rows, webs in one end of said cylinder block uniting the cylinders thereof, plates mounted upon the opposed end of said cylinder block uniting the cylinders thereof, journal bearing seats in said webs, a crank shaft therein, bearing caps thereon, said plates being arranged to sustain said bearing caps, rocker arms journaled in said cylinder block and in said plates, rocker arms journaled in the opposed end of said cylinder block, journal caps therefor, opposed pistons in said cylinders, connecting rods mounted on the ends of said rocker arms and connected with said crank shaft, links connected with said pistons and said rocker arms, and bolts uniting said rocker arm journal caps and said plates.

10. An internal combustion engine of the two stroke cycle opposed piston type comprising, a pair of cylinders disposed in parallel relation, integral tie webs uniting the lower portion of said cylinders and defining a recess between the upper portion of said cylinders, a crank shaft intermediate the central portion of said cylinders, a pair of opposed crank throws on said shaft, a pair of connecting rods oppositely disposed on each side of each of said crank throws, rocker arms mounted adjacent the ends of said cylinders and connected with said connecting rods, opposed pistons in said cylinders, links connecting said pistons with said rocker arms, crank shaft bearing caps, plates spanning said recess between the upper portion of said cylinders, rocker arm shafts journaled in said plates, rocker arm journal caps in the opposed end of said cylinders, and bolts parallel to the axis of said cylinders supporting said rocker arm journal caps and co-ordinated therewith to facilitate the assembly of said crank shaft.

11. An internal combustion engine of the opposed piston type comprising, a cylinder block, cylinders therein, pistons in said cylinders, transverse webs intermediate the lower portion of said cylinders and defining a recess intermediate the upper portion of said cylinders, a crank shaft mounted in said webs, and assembled through said recess, rocker arms supported by said cylinder block, connecting rods and links mounted on said rocker arms and connected respectively to said pistons and said crank shaft, and tie plates spanning said recess and uniting the upper portion of said cylinder block.

12. An internal combustion engine of the opposed piston type comprising a cylinder block, cylinders thereon, opposed pistons in said cylinders, chambers in the heads of said pistons, a crank shaft adjacent said cylinders and intermediate the ends thereof, connecting rods on said crank shaft, rocker arms adjacent the ends of said cylinders and connected with said connecting rods, links connecting said pistons with the opposed ends of said rocker arms, fluid passages in said rocker arms, mechanism for circulating a cooling fluid communicating with said fluid passages, inlet and outlet ports in said piston communicating with the chamber therein and means communicating with said inlet and outlet ports and said fluid passages in said rocker arms for circulating said cooling fluid to and from said chamber in said piston.

13. An internal combustion engine of the two stroke cycle opposed piston type comprising, a pair of cylinders disposed in parallel relation, a crank shaft intermediate the central portion of said cylinders, a pair of opposed crank throws on said shaft, a pair of connecting rods oppositely disposed on each side on each of said crank throws, oppositely disposed rocker arms mounted adjacent the ends of said cylinders and connected with said connecting rods, opposed pistons in said cylinders, links connecting said pistons with the opposed ends of said rocker arms, a crank shaft bearing cap, bearing blocks having journals therein for said rocker arms and means for securing said bearing blocks in assembled relation, said crank shaft bearing caps being adapted for retention by said bearing blocks.

14. An internal combustion engine of the two stroke cycle opposed piston type comprising an engine base, a pair of cylinders thereon disposed in spaced relation, a crank shaft between said cylinders, a pair of opposed crank throws on said shaft, a pair of connecting rods oppositely disposed on each side on each of said crank throws, oppositely disposed rocker arms mounted adjacent the ends of said cylinders and connected with said connecting rods, opposed pistons in said cylinders, links connecting said pistons with the opposed ends of said rocker arms, said engine base having openings therein arranged to facilitate the removal of said rocker arms, links and pistons therethrough.

HAROLD D. CHURCH.